US008860754B2

(12) United States Patent
Mackinlay et al.

(10) Patent No.: US 8,860,754 B2
(45) Date of Patent: Oct. 14, 2014

(54) METHODS AND SYSTEMS OF AUTOMATICALLY GENERATING MARKS IN A GRAPHICAL VIEW

(75) Inventors: Jock Douglas Mackinlay, Bellevue, WA (US); Christopher Richard Stolte, Seattle, WA (US)

(73) Assignee: Tableau Software, Inc., Seattle, WA (US)

( * ) Notice: Subject to any disclaimer, the term of this patent is extended or adjusted under 35 U.S.C. 154(b) by 658 days.

(21) Appl. No.: 12/214,818

(22) Filed: Jun. 22, 2008

(65) Prior Publication Data

US 2009/0319891 A1    Dec. 24, 2009

(51) Int. Cl.
| G06T 11/20 | (2006.01) |
| G09G 5/00 | (2006.01) |
| G06T 11/00 | (2006.01) |
| G06T 17/05 | (2011.01) |

(52) U.S. Cl.
CPC ............... *G06T 17/05* (2013.01); *G06T 11/00* (2013.01)
USPC .......................................... 345/619; 345/440

(58) Field of Classification Search
USPC .................................................. 345/440, 619
See application file for complete search history.

(56) References Cited

U.S. PATENT DOCUMENTS

| 5,383,029 | A | 1/1995 | Kojima ........................ 358/403 |
| 5,581,677 | A | 12/1996 | Myers et al. .................. 395/140 |
| 5,864,856 | A | 1/1999 | Young ........................... 707/100 |
| 6,301,579 | B1 | 10/2001 | Becker .......................... 707/102 |
| 6,725,230 | B2 | 4/2004 | Ruth et al. .................... 707/102 |
| 6,750,864 | B1 | 6/2004 | Anwar ........................... 345/440 |
| 7,089,266 | B2 | 8/2006 | Stolte et al. ................. 707/104.1 |
| 7,379,601 | B2 | 5/2008 | Yang et al. .................... 382/224 |
| 2004/0183800 | A1 | 9/2004 | Peterson ........................ 345/440 |
| 2005/0060300 | A1 | 3/2005 | Stolte et al. ....................... 707/3 |
| 2005/0099423 | A1 | 5/2005 | Brauss .......................... 345/440 |
| 2006/0206512 | A1 | 9/2006 | Hanrahan et al. ............ 707/102 |
| 2007/0073722 | A1* | 3/2007 | Ramer et al. ..................... 707/10 |
| 2007/0211056 | A1* | 9/2007 | Chakraborty et al. ........ 345/440 |
| 2008/0082348 | A1* | 4/2008 | Paulus et al. ..................... 705/1 |
| 2008/0117213 | A1* | 5/2008 | Cirit et al. ..................... 345/440 |
| 2008/0262327 | A1* | 10/2008 | Kato ............................. 600/324 |
| 2009/0231340 | A1* | 9/2009 | Savornin ....................... 345/440 |

* cited by examiner

*Primary Examiner* — Xiao Wu
*Assistant Examiner* — Wynton S Jones
(74) *Attorney, Agent, or Firm* — Morgan, Lewis & Bockius LLP (57) ABSTRACT

A computer-implemented method of generating marks in a graphical view includes receiving a first user request to associate a first set of data samples with a first visual mark property. In response to the first user request, area marks are displayed in a graphical view. Respective area marks correspond to respective data samples in the first set. A second user request is received to associate the first set of data samples with a second visual mark property. In response to the second user request, point marks are displayed in the graphical view. Respective point marks correspond to respective data samples in the first set.

14 Claims, 7 Drawing Sheets

(3 of 7 Drawing Sheet(s) Filed in Color)

| Store ID | City | State | ZIP | Latitude | Longitude | Market | Inventory | Type | ... | ... | ... | ... | ... | ... | ... | ... | ... | ... | ... | ... |
|---|---|---|---|---|---|---|---|---|---|---|---|---|---|---|---|---|---|---|---|---|
| 1 | Seattle | WA | 98109 | 47.6 | -122.3 | Northwest | 632 | Decaf | ... | | | | | | | | | | | |
| 1 | Seattle | WA | 98109 | 47.6 | -122.3 | Northwest | 854 | Regular | | ... | | | | | | | | | | |
| 2 | Portland | OR | 97209 | 45.5 | -122.7 | Northwest | 548 | Decaf | | | ... | | | | | | | | | |
| 2 | Portland | OR | 97209 | 45.5 | -122.7 | Northwest | 682 | Regular | | | | ... | | | | | | | | |
| 3 | Los Angeles | CA | 90049 | 34.0 | -118.2 | West | 720 | Decaf | | | | | ... | | | | | | | |
| 3 | Los Angeles | CA | 90049 | 34.0 | -118.2 | West | 594 | Regular | | | | | | ... | | | | | | |
| 4 | San Diego | CA | 92111 | 32.7 | -117.2 | West | 668 | Decaf | | | | | | | ... | | | | | |
| 4 | San Diego | CA | 92111 | 32.7 | -117.2 | West | 371 | Regular | | | | | | | | ... | | | | |
| 5 | Chicago | IL | 60605 | 41.8 | -87.6 | Midwest | 593 | Decaf | | | | | | | | | ... | | | |
| 5 | Chicago | IL | 60605 | 41.8 | -87.6 | Midwest | 611 | Regular | | | | | | | | | | ... | | |
| 6 | St. Louis | MO | 63144 | 38.6 | -90.2 | Midwest | 486 | Decaf | | | | | | | | | | | ... | |
| 6 | St. Louis | MO | 63144 | 38.6 | -90.2 | Midwest | 518 | Regular | | | | | | | | | | | | ... |
| ... | ... | ... | ... | ... | ... | ... | ... | ... | ... | ... | ... | ... | ... | ... | ... | ... | ... | ... | ... | ... | ... |

Dataset 100

Table of Data Samples 200
(Generated from Dataset 100)

| State | Latitude | Longitude | SUM(Inventory) | Type | |
|---|---|---|---|---|---|
| WA | 47.9 | -121.6 | 2465 | Decaf | 220-1 |
| WA | 47.9 | -121.6 | 3876 | Regular | 220-2 |
| OR | 44.9 | -121.8 | 3396 | Decaf | 220-3 |
| OR | 44.9 | -121.8 | 3744 | Regular | 220-4 |
| CA | 37.2 | -119.6 | 5820 | Decaf | 220-5 |
| CA | 37.2 | -119.6 | 5259 | Regular | 220-6 |
| IL | 31.0 | -117.9 | 2128 | Decaf | 220-7 |
| IL | 31.0 | -117.9 | 2337 | Regular | 220-8 |
| MO | 41.4 | -88.4 | 1822 | Decaf | 220-9 |
| MO | 41.4 | -88.4 | 1936 | Regular | 220-10 |

Columns: 202 (State), 204 (Latitude), 206 (Longitude), 208 (SUM(Inventory)), 210 (Type)

METHODS AND SYSTEMS OF AUTOMATICALLY GENERATING MARKS IN A GRAPHICAL VIEW

RELATED APPLICATIONS

This application is related to U.S. patent application Ser. No. 11/005,652, titled "Computer Systems and Methods for Visualizing Data with Generation of Marks," filed Dec. 2, 2004, which is hereby incorporated by reference in its entirety.

TECHNICAL FIELD

The disclosed embodiments relate generally to generating graphical views of data, and more specifically to automatically generating marks in a graphical view.

BACKGROUND

Graphical views provide user-friendly ways to analyze how data varies with respect to one or more parameters. In some graphical views, variation of data with respect to one or more parameters is illustrated by varying one or more visual properties of marks that correspond to respective data points. For example, marks that cover respective specified areas in a graphical view, which are referred to as area marks, may have colors or patterns that vary based on values of corresponding data. In another example, point marks displayed at distinct locations in a graphical view may have sizes that vary based-on values of corresponding data.

Map views provide an intuitive way to examine geographical variation of data. Two common examples of map views are choropleth maps, which are also referred to as filled maps, and proportional symbol maps. For choropleth maps, the marks are colors or patterns used to fill respective geographical regions; these marks are examples of area marks. For proportional symbol maps, symbols displayed at respective geographical locations vary by size in proportion to values of a parameter at the respective geographical locations or corresponding regions. These symbols are examples of point marks.

There is a need for user-friendly software to generate graphical views of data, such as map views. In particular, a user may desire to associate data with one or more visual mark properties and in response have appropriate symbols be displayed automatically. The user also may desire to modify the association of data with visual mark properties and have the graphical view update automatically.

SUMMARY

In some embodiments, a computer-implemented method of generating marks in a graphical view includes receiving a first user request to associate a first set of data samples with a first visual mark property. In response to the first user request, area marks are displayed in a graphical view. Respective area marks correspond to respective data samples in the first set. A second user request is received to associate the first set of data samples with a second visual mark property. In response to the second user request, point marks are displayed in the graphical view. Respective point marks correspond to respective data samples in the first set.

In other embodiments, a system for generating marks in a graphical view includes memory, one or more processors, and one or more programs stored in the memory and configured for execution by the one or more processors. The one or more programs include instructions to receive a first user request to associate a first set of data samples with a first visual mark property and instructions to display, in response to the first user request, area marks in a graphical view. Respective area marks correspond to respective data samples in the first set. The one or more programs also include instructions to receive a second user request to associate the first set of data samples with a second visual mark property and instructions to display, in response to the second user request, point marks in the graphical view. Respective point marks correspond to respective data samples in the first set.

In yet other embodiments, a computer readable storage medium stores one or more programs for use in generating marks in a graphical view. The one or more programs are configured to be executed by a computer system and include instructions to receive a first user request to associate a first set of data samples with a first visual mark property and instructions to display, in response to the first user request, area marks in a graphical view. Respective area marks correspond to respective data samples in the first set. The one or more programs also include instructions to receive a second user request to associate the first set of data samples with a second visual mark property and instructions to display, in response to the second user request, point marks in the graphical view. Respective point marks correspond to respective data samples in the first set.

BRIEF DESCRIPTION OF THE DRAWINGS

The patent or application file contains at least one drawing executed in color. Copies of this patent or patent application publication with color drawings will be provided by the Office upon request and payment of the necessary fee.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

To generate graphical views such as map views, a user first accesses a dataset containing data to be analyzed. The dataset includes one or more fields, including fields with data to be analyzed and, in some embodiments, fields with corresponding geographical information. The geographical information specifies geographical areas (e.g., regions or locations) corresponding to the data to be analyzed. For example, the geographical information may include one or more of the following fields: country; state or province; state or provincial capital; county or parish; Metropolitan Statistical Area (MSA); Core Based Statistical Area (CBSA); Designated Market Area (DMA); arbitrarily defined market region; school, congressional, or other district; address; city; street; street number; and ZIP code or other postal code. In some embodiments the geographical information is stored using Federal Information Processing Standards (FIPS) codes. Inclusion of fields specifying geographical areas allows data to be analyzed with respect to the specified geographical areas, thus permitting the user to see variation of raw data, or of parameters calculated from raw data, across the specified geographical areas. Geographical variation may be analyzed using map views or any other appropriate graphical views (e.g., a bar chart with separate bars for distinct geographical areas).

In some embodiments, the dataset includes location fields containing coordinates associated with one or more geographical fields, to enable creation of map views. For example, the location fields may specify latitude and longitude values or any other set of coordinates capable of being mapped. A dataset with location fields that contain coordinates is said to be geocoded. If the dataset accessed by a user is not geocoded, the dataset may be geocoded by adding appropriate location fields. Alternatively, a result set generated by querying the dataset for data to be displayed in a map view may be geocoded by adding appropriate location fields to the result set. In some embodiments, location fields may be added to the dataset or result set through a join operation with a table that includes coordinates for geographical areas listed in the dataset. For example, if the dataset or result set includes a "state" field, the dataset or result set may be geocoded by performing a join operation with a table that lists latitude and longitude values for each state (e.g., the latitude and longitude of the center of each state). In some embodiments, location fields may be manually added to the dataset or result set.

The dataset may be stored in any appropriate arrangement and location. For example, the dataset may be stored in a table or in a database containing multiple tables. The database may be stored locally or remotely.

Figure 1:
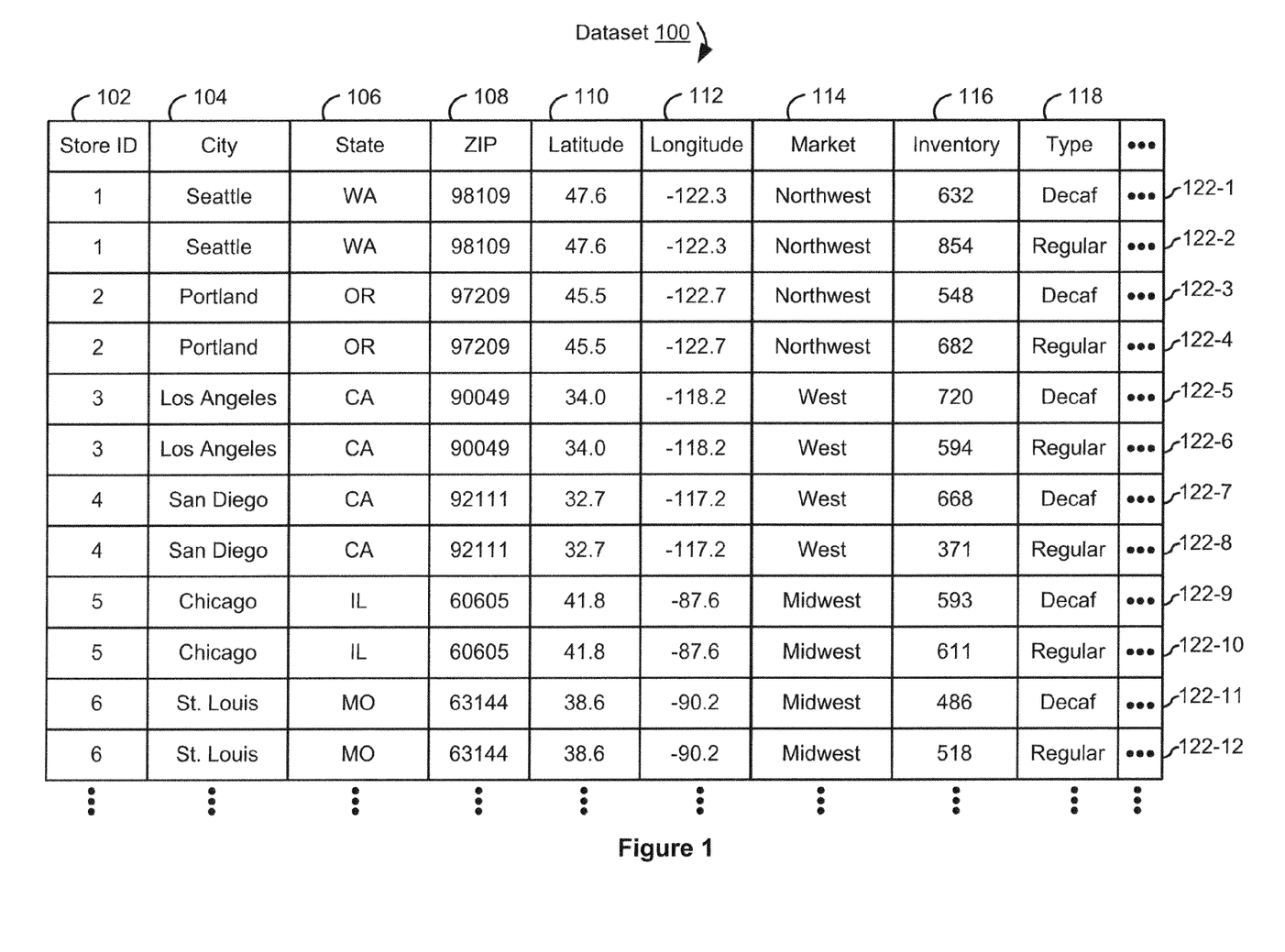
FIG. 1 is a conceptual block diagram of a prophetic example of a dataset having multiple fields in accordance with some embodiments.

FIG. 1 is a conceptual block diagram of a prophetic example of a dataset 100 having multiple fields 102 through 118 in accordance with some embodiments. The dataset 100 is shown as a single table for visual clarity but in some embodiments may correspond to multiple tables in a database or to any other appropriate arrangement. The dataset 100 includes records 122-1 through 122-12 listing data for a hypothetical coffee business with stores throughout the country. Each record 122 corresponds to a particular store, as specified by a store ID 102, and a particular type of coffee 118 (e.g., regular or decaf). Each record 122 includes an inventory 116 for a type of coffee at each store and includes several fields of geographical information, such as the city 104, state 106, ZIP code 108, and geographical market 114 for each store. In addition, the dataset 100 is geocoded: each record 122 includes latitude and longitude fields 110 and 112 for the corresponding store. In addition to the fields 102 through 118 shown in FIG. 1, the dataset 100 could include other fields. For example, the dataset 100 could include additional business data (e.g., sales and profits) for each combination of store 102 and coffee type 118 and additional fields of geographical information (e.g., street and street number of each store). The dataset 100 also could include additional sets of latitude and longitude fields: for example, a first set of latitude and longitude fields could have values corresponding to cities listed in the dataset and a second set of latitude and longitude fields could have values corresponding to states listed in the dataset.

To create a graphical view for analyzing the data in the dataset 100, a set of data samples (e.g., a result set) to be displayed in the graphical view is generated from the dataset 100. In some embodiments, generating the set of data samples includes aggregating data in the dataset 100. For example, a sum or average of inventory could be calculated by geographical area (e.g., for each city 104, state 106, zip code 108, or market 114). The sum or average could be calculated for each coffee type 118 or could be a total sum or average. A count of records for each combination of store ID 102 and a specified coffee type 118 could be calculated by geographical area, thus indicating the number of stores in each geographical area. Maximum or minimum inventory levels per store ID 102 could be calculated by geographical area. The set of data samples thus corresponds to one or more fields, such as the inventory field 116, in the dataset 100.

To perform these or similar calculations, the dataset 100 is queried and the relevant data is retrieved from the dataset 100 in response to the query. In some embodiments, the retrieved data is processed by geographical area, as specified by the user. If a map view is to be generated, the relevant latitude 110 and longitude 112 values also are retrieved or otherwise added to the result set. In some embodiments, if the dataset 100 includes a single relevant record for each specified geographical area, raw data from the dataset 100 may be displayed in a map view. Generating the set of data samples thus may include querying the database to retrieve the raw data and corresponding latitude 110 and longitude 112 values.

Figure 2:
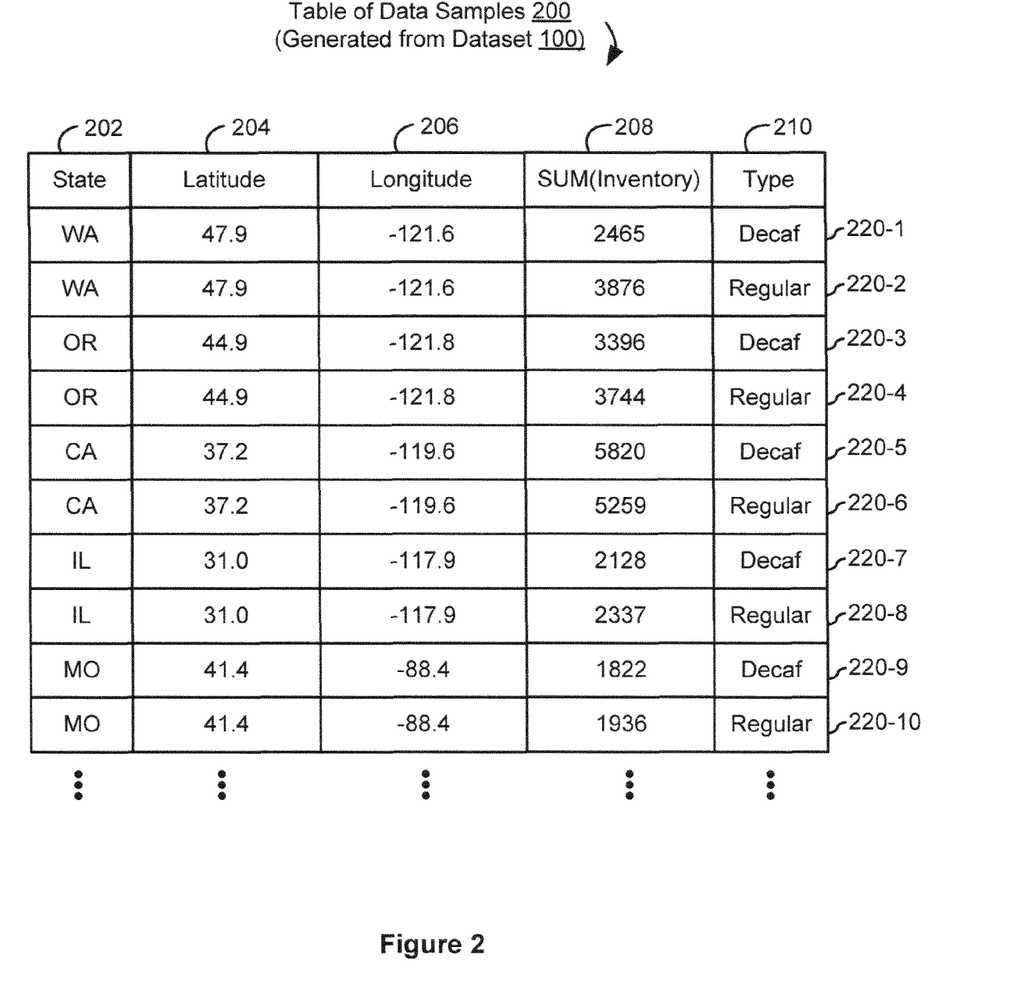
FIG. 2 is a conceptual block diagram of a prophetic example of a table data structure containing a set of data samples generated from a dataset in accordance with some embodiments.

FIG. 2 is a conceptual block diagram of a prophetic example of a table data structure 200 containing a set of data samples generated from the dataset 100 in accordance with some embodiments. The table 200, which is an example of a result set, is generated in response to instructions to sum the inventories 116 listed in the dataset 100 (FIG. 1) by state 106 and coffee type 118. The table 200 includes fields specifying the state 202 and coffee type 210, a field listing the inventory sum 208 for each combination of state 202 and coffee type 210, and corresponding latitude and longitude fields 204 and 206 for the state 202. The table 200 includes records 220-1 through 220-10 for the various combinations of state 202 and coffee type 210. The latitude and longitude fields 204 and 206 may be generated from the dataset 100 or separately added to the table 200 (e.g., by through a join operation with a table that includes coordinates for states listed in the state field 202).

Figure 3A:
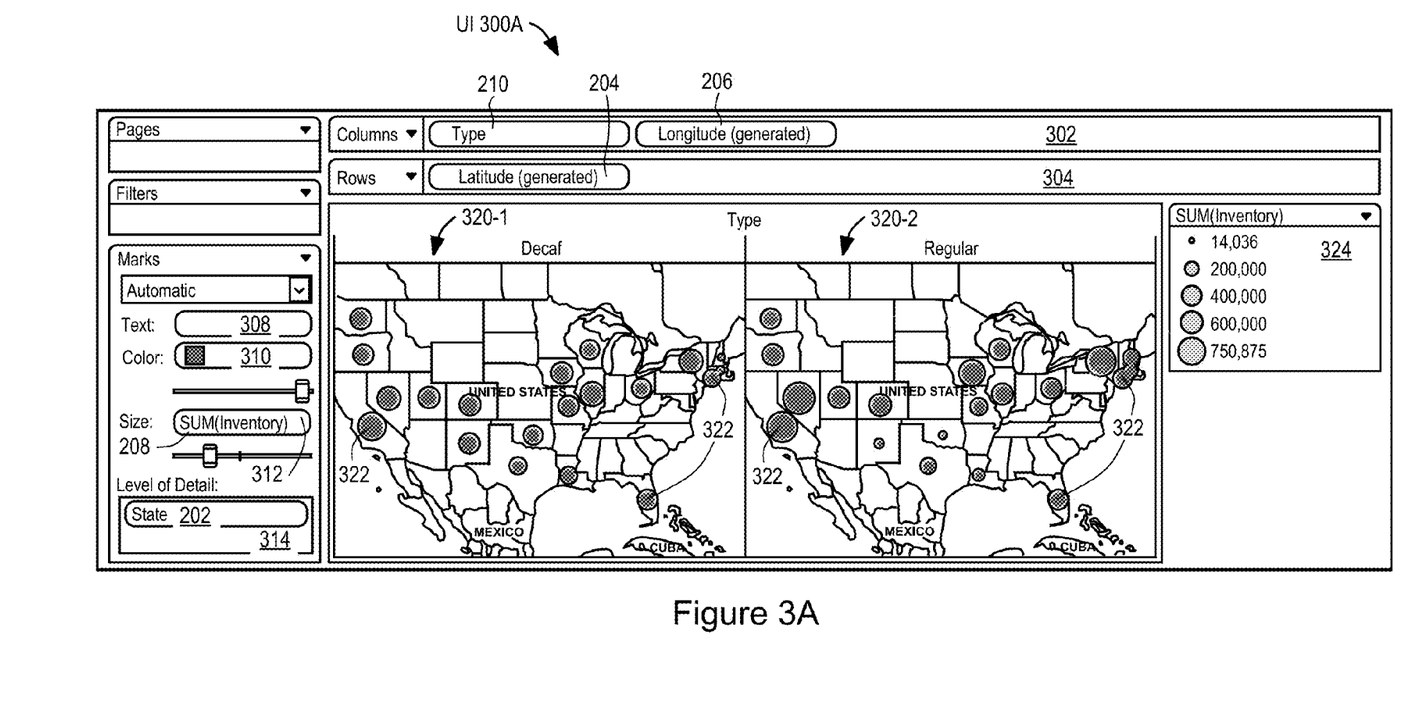
FIGS. 3A-3C are screenshots of a user interface for displaying map views in accordance with some embodiments.

FIG. 3A is a screenshot of a user interface (UI) 300A for displaying graphical views such as map views in accordance with some embodiments. The user interface 300A enables the user to specify a set of data samples (e.g., data samples in the table 200, FIG. 2) to be generated from the dataset 100 (FIG. 1) and to specify how to display the set of data samples in one or more map views 320. The UI 300A includes user input fields for specifying data to be displayed. In some embodiments, the user input fields are referred to as "shelves" and may include a "columns" shelf 302, a "rows" shelf 304, and a "level of detail" shelf 314. The UI 300A also includes user input fields for specifying visual properties of marks to be displayed in the one or more map views 320, including a mark text field 308, color field 310, and size field 312. In some embodiments, the UI 300A also includes a mark shape field (not shown), mark pattern field (not shown), mark edge/boundary field (not shown), and/or mark orientation field (not shown); each of these fields corresponds to a particular mark visual property. The term "visual property" as used herein does not encompass mark type (e.g., point or area), however. Various data samples (e.g., values from fields in the dataset 100 or calculated values based on fields in the dataset 100, such as aggregations of data in fields in the dataset 100) may be assigned to the shelves 302, 304, and 314 and mark specification fields 308, 310, and 312. Assigning x-axis mapping coordinates such as longitude 206 to the columns shelf 302 and y-axis mapping coordinates such as latitude 204 to the rows shelf 304 indicates that a map view, as opposed to another type of graphical view, is to be generated. Additionally adding coffee type 210 to the columns shelf 302 indicates that two map views 320-1 and 320-2 are to be generated, one for each coffee type 210. Adding "SUM(Inventory)" 208 to the mark size field 312 specifies that the size of each mark is to correspond to respective values of "SUM(Inventory)" 208. Adding "state" 202 to the level-of-detail shelf 314 specifies that the "SUM(Inventory)" quantity 208 is to be calculated on a per-state basis and that a separate mark is to be displayed for each state listed in the dataset 100.

Once the desired data samples have been specified in the appropriate shelves 302, 304, and 314 and mark specification fields 308, 310, and 312, the dataset 100 is queried, the table of data samples 200 (FIG. 2) is generated, one or more geographical maps is displayed in the UI 300A, and marks are generated on the map(s) corresponding to the data samples in the table 200. The geographical map(s) selected for display corresponds to the geographical area or areas specified on the level-of-detail shelf 314 and listed in the dataset 100. For example, in UI 300A, maps of the United States are displayed, since "State" 202, which corresponds to states of the United States as listed in the dataset 100, is specified on the level-of-detail shelf 314.

A mark 322 is displayed for each state for which the dataset 100 includes inventory data. The type of mark displayed in the map views 320-1 and 320-2 is automatically determined based on the contents of the fields 308, 310, and 312 for specifying mark visual properties. In the UI 300A, the mark types are symbols, as determined by a rule that symbol marks are to be displayed when data is specified in the mark size field 312. This automatic determination of mark type spares the user from having to specify mark type; indeed, the user can generate appropriate map views without knowing about different mark types. The size of each mark 322 corresponds to the quantity "SUM(Inventory)" 208, as listed in the "SUM (Inventory)" field 208 of the table 200 (FIG. 2) and illustrated in the key 324. In this example, the size of each mark is proportional to the quantity "SUM(Inventory)" 208, such that mark sizes increase with increasing values of "SUM(Inventory)" 208, as illustrated in the key 324.

In some embodiments, the user does not need to add longitude 206 to the columns shelf 302 and latitude 204 to the rows shelf 304 to specify that a map view is to be generated. Instead, if a geographical field (e.g., "State" 202) is added to the level-of-detail shelf 314, the system automatically determines that a map view is to be generated and automatically adds longitude 206 to the columns shelf 302 and latitude 204 to the rows shelf 304. In some embodiments, whether a field is geographical is specified in the schema of the dataset 100 (FIG. 1).

Figure 3B:
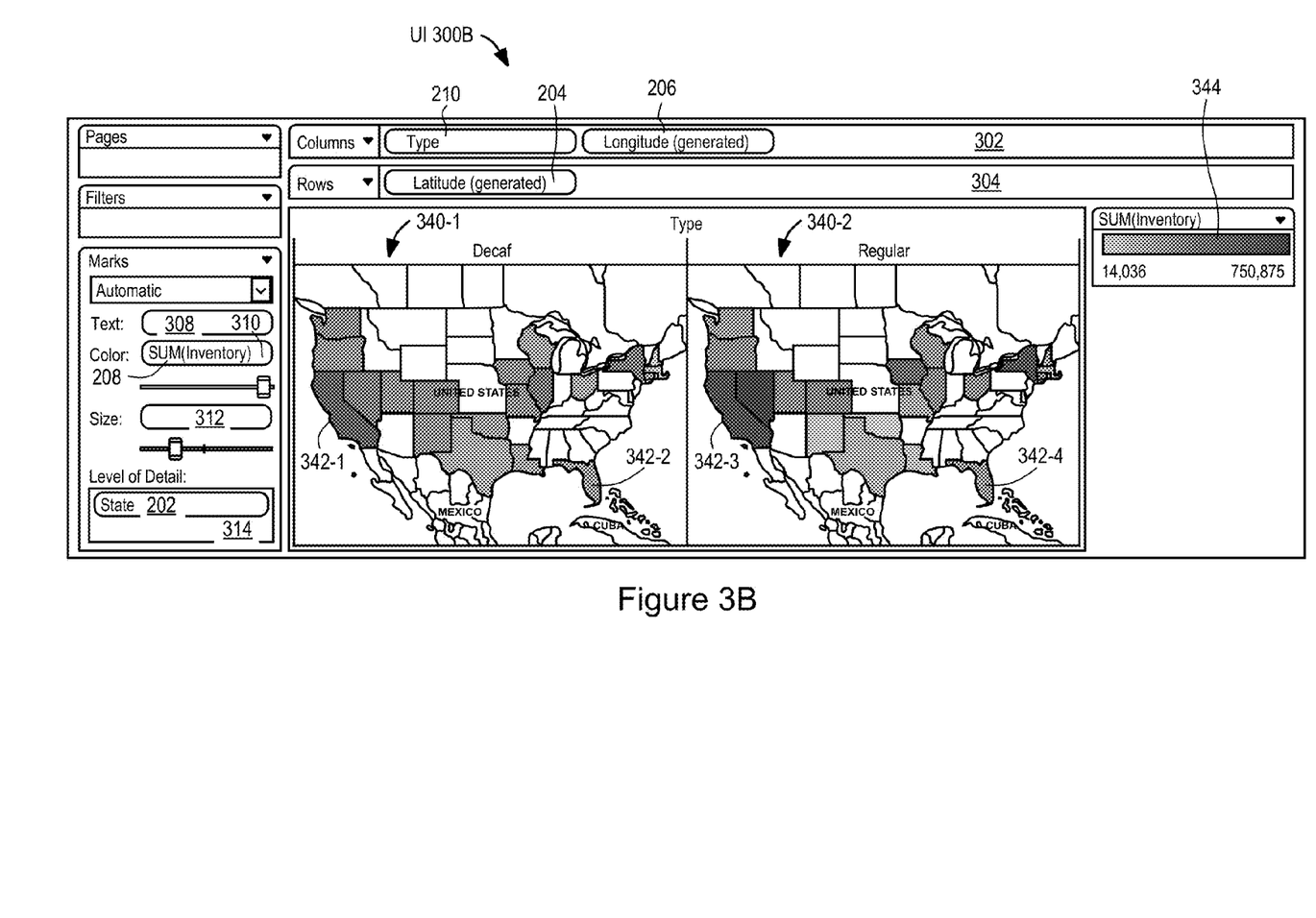

A user viewing the map views 320-1 and 320-2, which are proportional symbol maps, may desire to transition to different map views. For example, the user may desire to transition from display of proportional symbol maps to display of choropleth (i.e., filled) maps, to transition from display of marks of varying size to marks of varying color, or simply to try an alternate view. To accomplish this transition, "SUM (Inventory)" 208 is removed from the mark size field 312 and added to the mark color field 310, as illustrated in UI 300B (FIG. 3B). In response, the symbols 322 are removed from the displayed map and replaced with fill colors 342 (e.g., 342-1 and 342-3 for California, and 342-2 and 342-4 for Florida), resulting in map views 340-1 and 340-2. The map views 340-1 and 340-2 show choropleth maps with area marks 342, as opposed to the proportional symbol maps of map views 320-1 and 320-2 (FIG. 3A). The use of area marks 342 is automatically determined based on a rule that area marks are to be displayed when data is specified in the mark color field 310 and not in the mark size field 312. The fill color of each mark 342 corresponds to the quantity "SUM(Inventory)" 208, as listed in the table 200 (FIG. 2) and illustrated in the key 344. In this example, the fill colors 342 are shades of green with darkness proportional to the quantity "SUM(Inventory)" 208, such that darker shades correspond to larger values of "SUM(Inventory)" 208.

Marks displayed in a map view may have multiple respective visual properties that vary based on multiple respective sets of data. For example, a mark's color may vary based on a first set of data and its size may vary based on a second set of data, as illustrated in the UI 300C (FIG. 3C) in accordance with some embodiments. The UI 300C is generated from the UI 300B (FIG. 3B) by leaving "SUM(Inventory)" 208 in the mark color field 310, leaving "State" 202 in the level-of-detail shelf 314, and adding the quantity "SUM(Profit)" 364 to the mark size field 312 (this example assumes that the dataset 100 includes a "Profit" field). In response, display of the marks 342 (FIG. 3B) ceases, a result set listing the quantities "SUM (Inventory)" 208 and "SUM(Profit)" 364 is created, and marks 362 are displayed in the map views 360-1 and 360-2. The marks 362 are symbols with sizes that vary based on values of "SUM(Profit)" 364, as illustrated in the key 368, and colors that vary based on values of "SUM(Inventory)" 208, as illustrated in the key 366. The use of symbols for the marks 362 is automatically determined based on a rule that symbol marks are to be displayed when data is specified in the mark size field 312, regardless of whether or not data is specified in the mark color field 310.

Figure 3C:
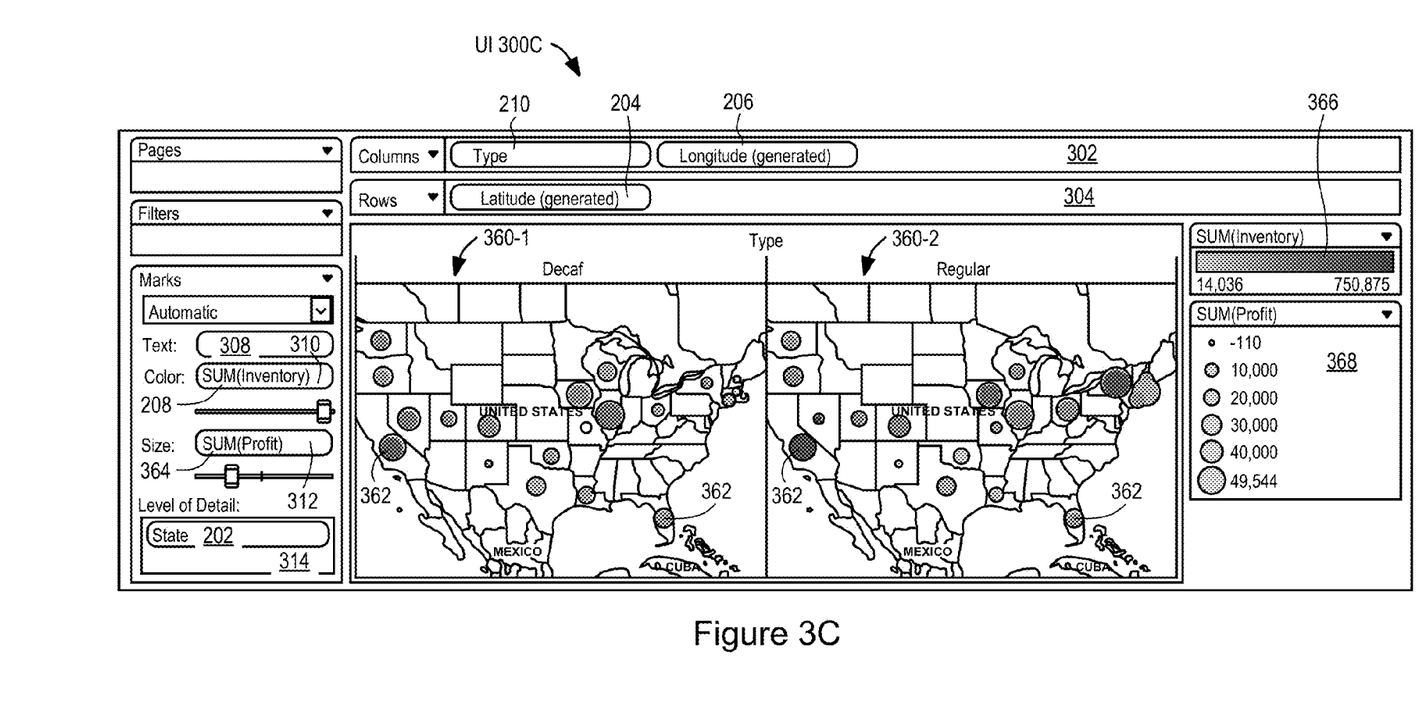

The UIs 300A-300C thus allow a user to transition between map views by modifying the contents of mark specification fields 308, 310, and 312, in response to which the type of mark to be displayed is selected based on a set of rules. In some embodiments the UIs 300A-300C also enable a user to transition between a map view and another type of graphical display. For example, a user viewing the map views 320-1 and 320-2 in the UI 300A (FIG. 3A) may desire to view another type of graphical view (e.g., a chart) of inventory by state instead. In some embodiments, this transition is achieved by modifying the sets of data samples specified in the columns shelf 302 and rows shelf 304 and/or in the mark specification fields 308, 310, and 312. For example, the user may delete longitude 206 from the columns shelf 302 and latitude 204 from the rows shelf 304, in response to which the map views 320-1 and 320-2 are replaced with another type of graphical view. The shelves 302, 304, and 314 and fields 308, 310, and 312 thus may be used to generate both map views and other types of graphical views.

Figure 4:
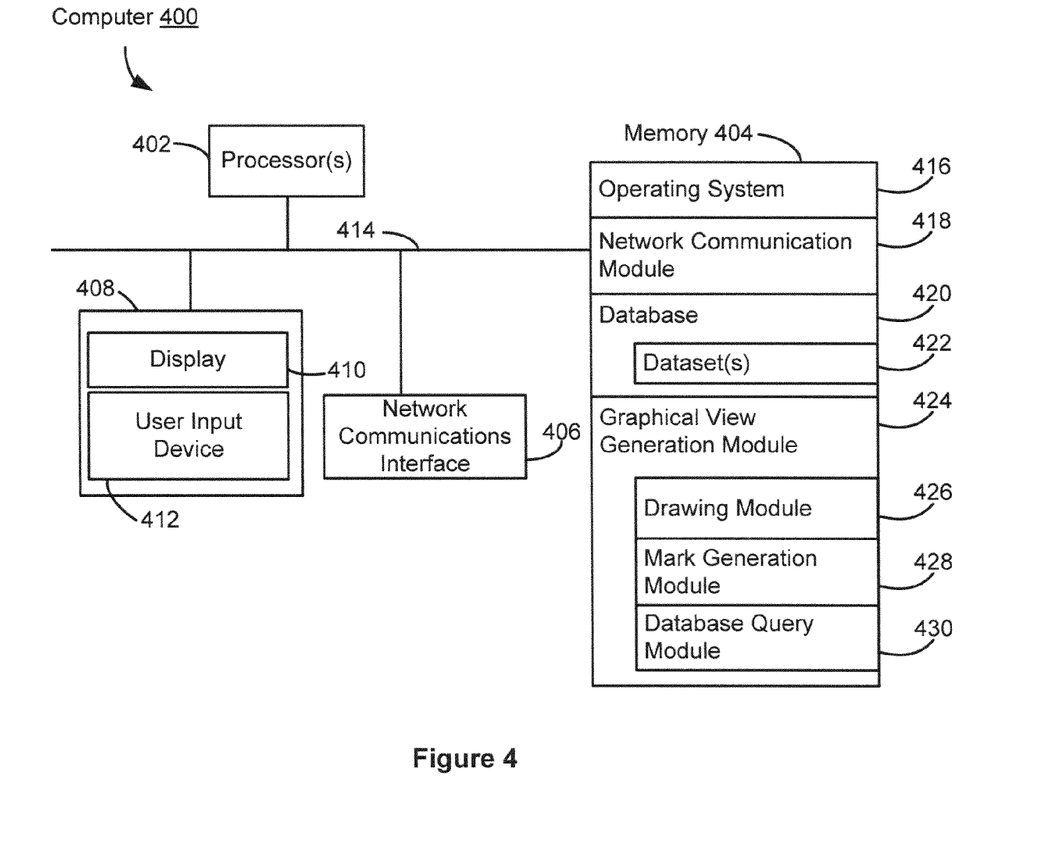
FIG. 4 is a block diagram illustrating a computer system for generating graphical views in accordance with some embodiments.
Figure 5:
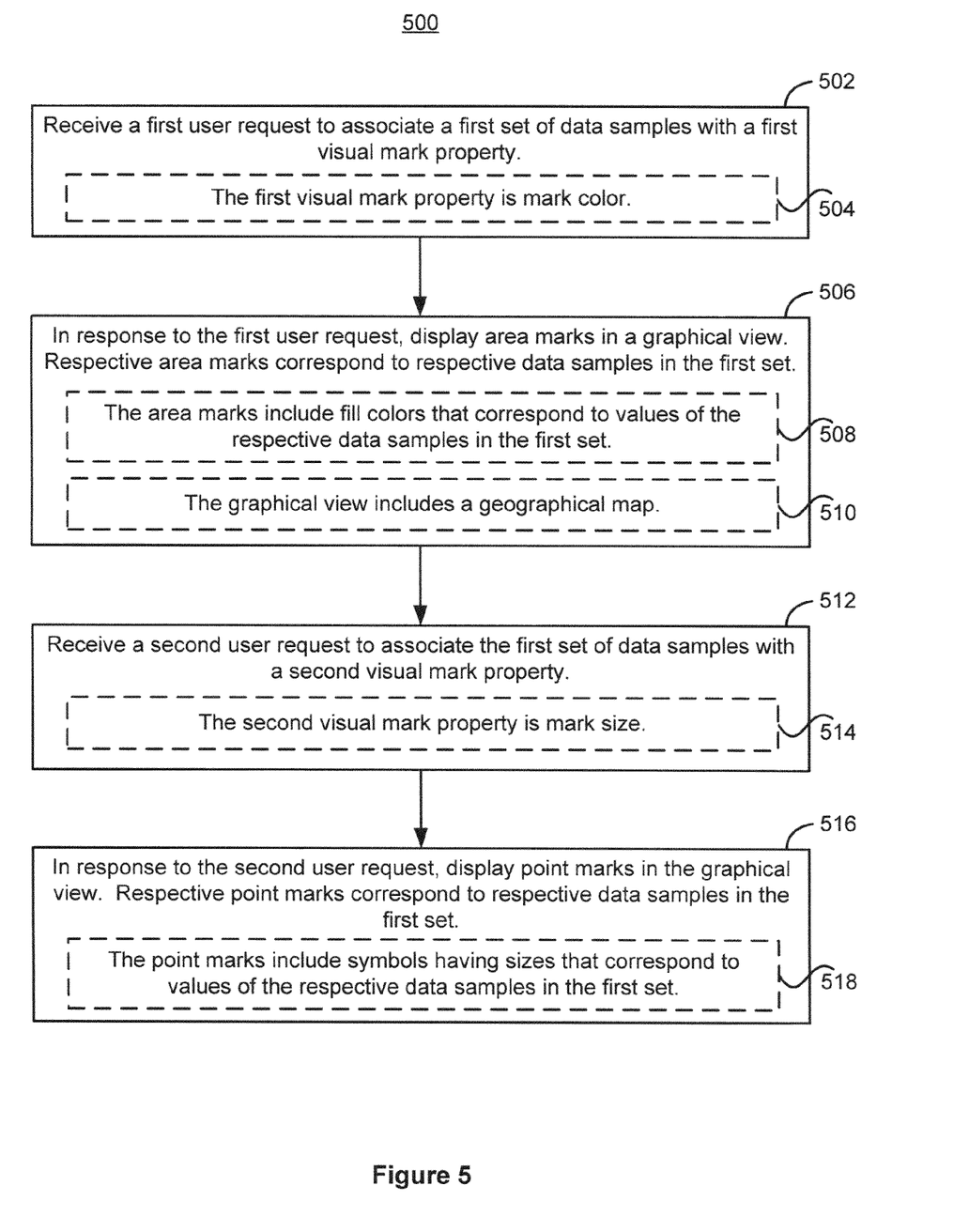
FIG. 5 is a flow diagram illustrating a method of generating marks in a graphical view in accordance with some embodiments.

FIG. 4 is a block diagram illustrating a computer system 400 for generating graphical views in accordance with some embodiments. The computer system 400 typically includes one or more processors 402, one or more network or other communications interfaces 406, memory 404, and one or more communication buses 414 for interconnecting these components. The one or more network or other communications interfaces 406 allow transmission and reception of data and instructions through a network connection. The communication buses 414 may include circuitry (sometimes called a chipset) that interconnects and controls communications between system components. The computer system 400 may also include interface devices 408, such as a display device 410 and a user input device 412. User interface images (e.g., UIs 300A-300C, FIGS. 3A-3C) may be displayed on the display device 410 under the control of the graphical view generation module 424, described below. Examples of user input devices 412 include a keyboard, mouse, trackball, touchpad, or touch screen. Memory 404 includes high-speed random access memory, such as DRAM, SRAM, DDR RAM or other random access solid-state memory devices, and may include non-volatile memory, such as one or more magnetic disk storage devices, optical disk storage devices, flash memory devices, or other non-volatile solid-state storage devices. Memory 404 may optionally include one or more storage devices remotely located from the processor(s) 402. Memory 404, or alternately the non-volatile memory device(s) within memory 404, comprises a computer readable storage medium. In some embodiments, memory 404 stores the following programs, modules, and data structures, or a subset thereof:

- an operating system 416 that includes procedures for handling various basic system services and for performing hardware-dependent tasks;
- a network communication module 418 that is used for connecting the computer system 400 to other computers via the one or more communication network interfaces 406 and one or more communication networks, such as the Internet, wide area networks, local area networks, metropolitan area networks, and the like;
- a database 420 that includes one or more datasets 422 (e.g., one or more datasets 100, FIG. 1); and
- a graphical view generation module 424 for generating graphical views (e.g., map views) based on data from the one or more datasets 422. In some embodiments, the graphical view generation module 424 includes instructions to perform the method 500 (FIG. 5, below).

In some embodiments, the database 420 is stored externally to the computer system 400. For example, the database 420 may be stored on a server in communication with the computer system 400 through a network.

In some embodiments, the graphical view generation module 424 includes a drawing module 426 for selecting and displaying a type of graphical view; a mark generation module 428 for determining mark types, appearances, and locations and generating corresponding marks on a graphical view; and a database query module 430 for querying a dataset 422 to generate a set of data samples corresponding to one or more fields in the dataset 422.

In some embodiments, instructions corresponding to all or a portion of the graphical view generation module 424 are stored at and executed by a server that transmits the results to the computer system 400 for display.

Each of the above identified elements 416-430 in FIG. 4 may be stored in one or more of the previously mentioned memory devices. Each of the above identified modules corresponds to a set of instructions for performing a function described above. The above identified modules or programs (i.e., sets of instructions) need not be implemented as separate software programs, procedures, or modules, and thus various subsets of these modules (or sets of instructions) may be combined or otherwise re-arranged in various embodiments. In some embodiments, memory 404 may store a subset of the modules and data structures identified above. Furthermore, memory 404 may store additional modules and data structures not described above.

FIG. 5 is a flow diagram illustrating a computer-implemented method 500 of generating marks in a graphical view in accordance with some embodiments. In some embodiments, the method 500 is performed at a computer system 400 (FIG. 4) by executing instructions associated with the graphical view generation module 424. Alternatively, some operations in the method 500 are performed at a server in communication with the computer system 400.

A first user request is received (502) to associate a first set of data samples with a first visual mark property. In some embodiments, the first visual mark property is (504) mark color. For example, in the UI 300B (FIG. 3B), "SUM(Inventory)" 208 is added to the mark color field 310, thus associating "SUM(Inventory)" 208 with mark color. Alternatively, the first visual mark property may be mark pattern, such as the patterns used to fill respective marks.

In response to the first user request, area marks (e.g., marks 342-1 through 342-4, FIG. 3B) are displayed (506) in a graphical view (e.g., map view 340-1 or 340-2, FIG. 3B). Respective area marks correspond to respective data samples in the first set.

In some embodiments, the area marks include fill colors that correspond (508) to values of the respective data samples in the first set. For example, in UI 300B the shade of green for each mark 342 corresponds to the value of "SUM(Inventory)" 208 for the corresponding state. In general, variation of color between respective marks corresponds to variation in the values of their respective data samples, and may include variation in hue, saturation, and/or brightness. The various colors used for respective marks may be various shades of a single hue, such as various shades of gray determined according to a grayscale that corresponds to values of the respective data samples. For example, the darkness of the fill color may increase with increasing data sample values. Alternatively, the darkness of the fill color may decrease with increasing data sample values. Two or more hues could be used, with each hue corresponding to a distinct range of data sample values and the darkness of each fill color increasing for increasing data sample values within each range.

In some embodiments, the area marks include fill patterns that correspond to values of the respective data samples in the first set. For example, distinct fill patterns may correspond to distinct values. In another example, the density of the fill pattern may either increase or decrease with increasing data sample values.

In some embodiments, the graphical view includes (510) a geographical map (e.g., the map of the United States in map view 340-1 or 340-2, FIG. 3B).

A second user request is received (512) to associate the first set of data samples with a second visual mark property. In some embodiments, the second visual mark property is (514) mark size. For example, in the UI 300A (FIG. 3A), "SUM (Inventory)" 208 is added to the mark size field 312, thus associating "SUM(Inventory)" 208 with mark size.

In response to the second user request, point marks (e.g., symbol marks 322, FIG. 3A) are displayed (516) in the graphical view (e.g., the map views 320-1 and 320-2, FIG. 3A). Respective point marks correspond to respective data samples in the first set. In some embodiments, the point marks replace the area marks displayed in operation 506.

In some embodiments, the point marks include symbols having sizes that correspond (518) to values of the respective data samples in the first set. In some embodiments, the symbols have sizes proportional to the values of the respective data samples in the first set. For example, sizes of the marks 322 (FIG. 3A) are proportional to values of "SUM(Inventory)" 208 for respective states. Alternatively, the values of data samples may be divided into ranges and the size of each symbol is determined by the range into which its respective data sample falls, with higher ranges having larger symbol sizes.

In some embodiments in which the graphical view includes a geographical map, respective data samples in the first set are associated with respective geographical values (e.g., respective values in the "SUM(Inventory)" field 208, FIG. 2, are associated with respective states in the "State" field 202). The area marks and point marks have display locations on the geographical map that correspond to the respective geographical values associated with their respective data samples. In some embodiments, the area marks have fill colors that correspond to values of their respective data samples and the point marks include symbols having sizes that correspond to values of their respective data samples.

In some embodiments, the second user request further associates a second set of data samples with the first visual mark property, the first visual mark property being mark color. In response, the symbols have colors that correspond to values of the respective data samples in the second set. In some embodiments, the first and second sets of data samples correspond to respective first and second fields in a dataset. For example, the request that associates "SUM(Inventory)" 208 with mark size could also associate "SUM(Profit)" 364 with mark color, resulting in display of map views with symbols for which size varies with "SUM(Inventory)" 208 and color varies with "SUM(Profit)" 364. (FIG. 3C illustrates similar map views, but with the data associations reversed: in FIG. 3C, "SUM(Inventory)" 208 is associated with color and "SUM(Profit)" 364 with size.)

In some embodiments in which the first set of data samples corresponds to a first field of a dataset, the first set is generated from the dataset by querying the dataset (e.g., dataset 100, FIG. 1) to retrieve data from the first field. In some embodiments, the first set of data samples is generated from the dataset by aggregating data in the first field with respect to associated geographical data (e.g., geographical data in a geographical field in the dataset, such as city 104, state 106, zip 108, or market 114, FIG. 1). Aggregating data in the first field may include, for example, calculating sums (e.g., "SUM (Inventory)" 208, FIG. 2), averages, or counts of data in the first field for respective values of the associated geographical data. In some embodiments, the first set of data samples is generated from the dataset by calculating, for respective values of associated geographical data, maximum or minimum values of data in the first field. These options for generating the first field are also options for generating the second field.

The method 500 thus provides a user-friendly way to create graphical views without having to specify mark type explicitly. The method 500 also allows easy transitioning between different graphical views, thereby simplifying data analysis. While the method 500 includes a number of operations that appear to occur in a specific order, it should be apparent that the method 500 can include more or fewer operations and that an order of two or more operations may be changed. For example, operations 512 and 516 could precede operations 502 and 506.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of generating marks in a graphical view, comprising:
at a computer system having one or more processors and memory storing one or more programs for execution by the one or more processors:
obtaining a data set having a plurality data fields;
receiving a first user request to associate a first field in the plurality of data fields with a first visual mark property, wherein the first visual mark property is an area fill;
receiving a second user request to associate a second data field in the plurality of data fields with a second visual mark property, wherein the second visual mark property is mark size;
receiving a third user request specifying a third data field in the plurality of data fields; and
responsive to the first user request, the second user request, and the third user request:
automatically identifying, without requiring user input, a total number of different values in the third data field by scanning values in the third data field; and
responsive to identifying the total number of different values in the third data field:
concurrently displaying, without requiring user input, in a graphical view, a plurality of graphs in accordance with the first, second, and third data fields, wherein
(A) total number of graphs in the plurality of graphs concurrently displayed corresponds to the total number of different values in the third data field,
(B) each graph in the plurality of graphs includes a set of point marks, and
(c) point marks included in each graph have:
(a) sizes that correspond to values, from the data set, associated with the first data field; and
(b) area fills that correspond to values, from the data set, associated with the second data field.

2. The computer-implemented method of claim 1, wherein:
the area fill corresponds to fill color; and
the point marks include fill colors that correspond to values within the second data field.

3. The computer-implemented method of claim 1, wherein the point marks have sizes proportional to the values within the first data field.

4. The computer-implemented method of claim 1, wherein the graphical view includes a geographical map.

5. The computer-implemented method of claim 1, wherein the first data field includes data aggregated from two or more data fields in the plurality of data fields, in accordance with one or more geographical rules.

6. The computer-implemented method of claim 5, wherein the data aggregated from two or more data fields include:
sums, averages, or counts of data from the two or more data fields in accordance with the one or more geographical rules.

7. The computer-implemented method of claim 5, wherein the data aggregated from two or more data fields include:
a maximum or a minimum value both of which are calculated using data from the two or more data fields in accordance with the one or more geographical rules.

8. The computer-implemented method of claim 1, wherein the first user request corresponds to a user input causing a first shelf in a user interface to be populated with a specification of the first set of data samples, the first shelf associated with the first visual mark property.

9. The computer-implemented method of claim 1, wherein the second user request corresponds to a user input causing a second shelf in a user interface to be populated with a specification of the second set of data samples, the second shelf associated with the second visual mark property.

10. The computer-implemented method of claim 1, wherein:
the area fill corresponds to fill pattern; and
the point marks include fill patterns that correspond to values within the first data field.

11. The computer-implemented method of claim 1, further comprising,
in accordance with a determination that values associated with the first data field specify geographical locations:
selecting, form a plurality of distinct views, a map view; and
automatically, without user intervention, formatting for display the plurality of graphs in the map view.

12. The computer-implemented method of claim 1, wherein the first data field and the second data field are associated with two distinct levels-of-detail, including (i) a principle level-of-detail, and (ii) two or more sub-levels-of-detail under the principle level-of-detail; and further comprising:
in accordance with a determination that the plurality of graphs is to be displayed on the principle level of detail:
determining the sizes and area fills of the point marks, in accordance with values aggregated from the two or more sub-levels-of details.

13. A system for generating marks in a graphical view, the system comprising:
memory;
one or more processors; and
one or more programs stored in the memory and configured for execution by the one or more processors, the one or more programs including instructions for:
obtaining a data set having a plurality data fields;
receiving a first user request to associate a first field in the plurality of data fields with a first visual mark property, wherein the first visual mark property is an area fill;
receiving a second user request to associate a second data field in the plurality of data fields with a second visual mark property, wherein the second visual mark property is mark size;
receiving a third user request specifying a third data field in the plurality of data fields; and
responsive to the first user request, the second user request, and the third user request:
automatically identifying, without requiring user input, a total number of different values in the third data field by scanning values in the third data field; and
responsive to identifying the total number of different values in the third data field:
concurrently displaying, without requiring user input, in a graphical view, a plurality of graphs in accordance with the first, second, and third data fields, wherein
(A) total number of graphs in the plurality of graphs concurrently displayed corresponds to the total number of different values in the third data field,
(B) each graph in the plurality of graphs includes a set of point marks, and
(c) point marks included in each graph have:
(a) sizes that correspond to values, from the data set, associated with the first data field; and
(b) area fills that correspond to values, from the data set, associated with the second data field.

14. A non-transitory computer readable storage medium storing one or more programs for use in generating marks in a graphical view, the one or more programs configured to be executed by a computer system and comprising instructions for:
obtaining a data set having a plurality data fields;
receiving a first user request to associate a first field in the plurality of data fields with a first visual mark property, wherein the first visual mark property is an area fill;
receiving a second user request to associate a second data field in the plurality of data fields with a second visual mark property, wherein the second visual mark property is mark size;
receiving a third user request specifying a third data field in the plurality of data fields; and
responsive to the first user request, the second user request, and the third user request:
automatically identifying, without requiring user input, a total number of different values in the third data field by scanning values in the third data field; and
responsive to identifying the total number of different values in the third data field:
concurrently displaying, without requiring user input, in a graphical view, a plurality of graphs in accordance with the first, second, and third data fields, wherein
(A) total number of graphs in the plurality of graphs concurrently displayed corresponds to the total number of different values in the third data field,
(B) each graph in the plurality of graphs includes a set of point marks, and
(C) point marks included in each graph have:
(a) sizes that correspond to values, from the data set, associated with the first data field; and
(b) area fills that correspond to values, from the data set, associated with the second data field.

* * * * *

UNITED STATES PATENT AND TRADEMARK OFFICE
CERTIFICATE OF CORRECTION

PATENT NO. : 8,860,754 B2  
APPLICATION NO. : 12/214818  
DATED : October 14, 2014  
INVENTOR(S) : Mackinlay et al.

It is certified that error appears in the above-identified patent and that said Letters Patent is hereby corrected as shown below:

In The Claims

Claim 1, col. 10, line 13, please delete "plurality data" and insert --plurality of data--; and Claim 13, col. 11, line 40, please delete "plurality data" and insert --plurality of data--; and Claim 14, col. 12, line 20, please delete "plurality data" and insert --plurality of data--.

Signed and Sealed this
Twentieth Day of January, 2015

Michelle K. Lee
*Deputy Director of the United States Patent and Trademark Office*